United States Patent Office 3,428,797
Patented Feb. 18, 1969

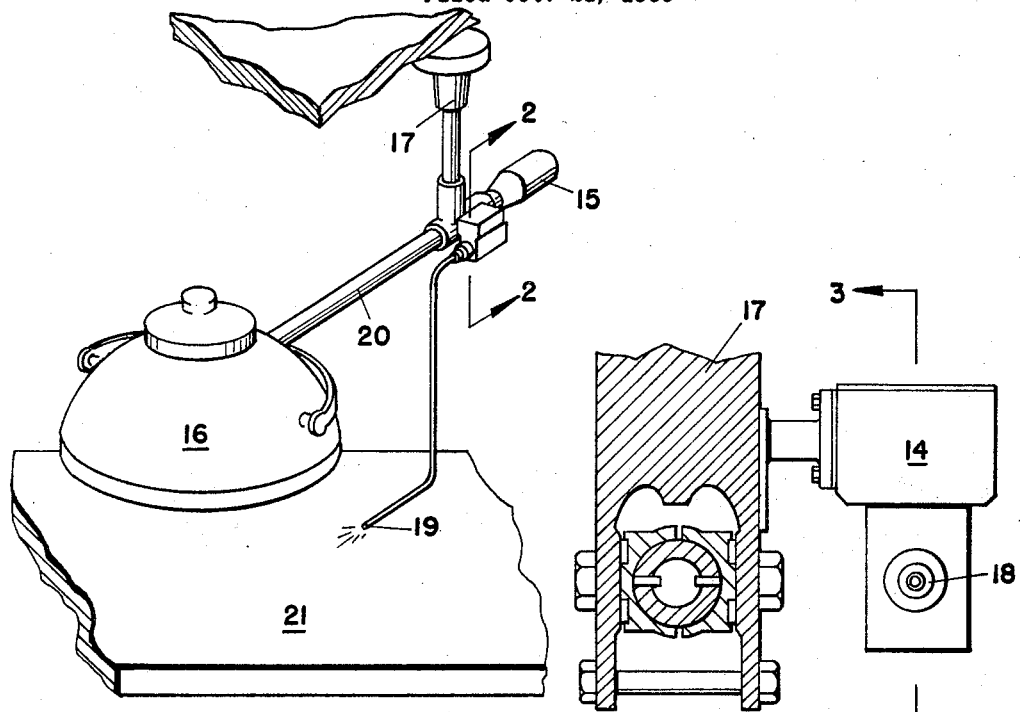
FIG. 1
FIG. 2
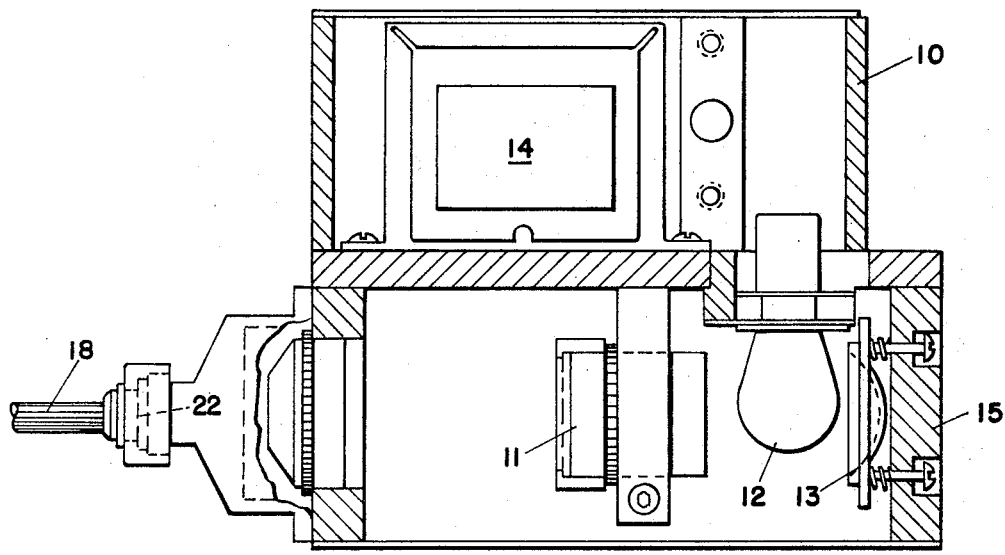
FIG. 3
INVENTOR.
HOWARD HAYNES

3,428,797
SURGICAL LIGHT
Howard Haynes, Erie, Pa., assignor to American Sterilizer Company, Erie, Pa., a corporation of Pennsylvania
Filed Oct. 21, 1965, Ser. No. 499,320
U.S. Cl. 240—1.4  3 Claims
Int. Cl. A61g 13/00

ABSTRACT OF THE DISCLOSURE

The device disclosed herein is a combination of a surgical light having a reflector supported on a yoke and an optical fiber arrangement made up of an elongated flexible optical fiber bundle. A light source for the optical fiber is attached to the yoke and to the optical fibers. Thus, the reflector can be supported over a patient on an operating table and the physician can use the optical fiber for local light concentrated on a local area of the patient.

---

Surgical lights utilizing optical fibers and the principles related thereto are known to the art as evidenced by Patents 624,392 and 3,068,739. These types of lighting devices are frequently used in combination with surgical tables along with a conventional overhead reflector type light. In such combinations, it has been difficult to locate the light source for the optical fibers in a convenient efficient place.

According to the present invention, the light source for the optical fibers is located in combination with and on the support for the reflector type light. It has been discovered that by locating the light source in this position, the optical fibers will be in a convenient place out of the way when the light is not in use and when the optical fiber light is in use, the fibers extend downwardly in a manner which is most convenient for the surgeon and the operating team.

It is, accordingly, an object of the present invention to provide an improved surgical light.

Another object is to provide a new combination reflector type light and optical fiber light.

A further object is to provide an improved surgical light.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an isometric view of a light and table according to the invention;

FIG. 2 is a cross sectional view taken on line 2—2 of FIG. 1; and

FIG. 3 is an enlarged cross sectional view taken on line 3—3 of FIG. 2 showing the light source for the optical fiber light.

Now with more particular reference to the drawing, the combination surgical reflector type light and optical fiber light is shown in FIG. 1 supported above a table 21. A light source 10 for the optical fiber light may be of the general type shown in Patent 3,068,739. The light source has the optical lens system 11 in an enclosure which receives light from a lamp 12. This lamp is focused on the end 22 of the optical fibers nearest the light source. The fibers are in bundles 18 which are of the type familiar to those skilled in the art. Power may be supplied to the lamp 12 from a suitable power source by way of a transformer 14 or any other suitable power source. Light rays from lamp 12 which would otherwise be lost are reflected by a properly designed mirror 13 onto the ends 22 of the fibers in order to improve the efficiency of the device.

The reflector 16 is of the type commonly used on surgical lamps. It is attached to the yoke 20 which is, in turn, supported on the support 17. The handle 15 is attached to the yoke 20 so that the reflector can be positioned as desired by the person responsible.

In use, as a typical example, a patient will be positioned on the table 21. The reflector light 16 will be directed as desired. When it is desired to project a light on an inaccessible part of the patient's body, for example, light from lamp 12 will be projected on the ends 22 of the optical fibers of bundle 18. Light will project from the ends 19.

The foregoing specification sets forth the invention in its preferred practical forms but it is understood that the structure shown is capable of modification within a range of equivalents without departing from the invention which is to be understood is broadly novel as is commensurate with the appended claims.

What is claimed is:

1. In combination, a reflector type surgical light and an optical fiber light,
    said surgical light having a bracket adapted to be fixed to a support above an operating table with said surgical light disposed to direct light toward said table for use in a surgical procedure,
    an optical fiber light comprising a light source supported on said bracket at a position spaced from said reflector,
    an elongated flexible optical cord comprising optical fibers,
    said optical cord having its first end attached to said light source and a second end extending freely therefrom,
    said light source comprising an electrical lamp,
    and means to direct light from said lamp onto said first end of said optical cord,
    said second end of said optical cord being adapted to emit light from said light source for use on an object on said table.

2. In combination, a surgical light having a reflector supported on a yoke and an elongated flexible optical fiber light,
    said yoke having yoke support means thereon for attaching it to a ceiling or the like,
    said optical fiber light comprising an enclosure,
    said enclosure being supported on said yoke support at a position spaced from said reflector,
    a light source in said enclosure, a first end of said optical fiber light being attached to said enclosure and extending freely downwardly and terminating in a free end,
    said light source comprising an electrical lamp,
    a lens for focusing light from said lamp onto said first end of said optical light,
    said optical light having a second end,
    said second end of said optical light being adapted to emit light from said lamp.

3. In combination, a surgical light having a reflector supported on a yoke and an elongated flexible optical fiber light,
    said yoke having yoke support means thereon for attaching it to a ceiling or the like,
    said optical fiber light comprising an enclosure,
    said enclosure being supported on said yoke support at a position spaced from said reflector,
    a light source in said enclosure, a first end of said optical fiber light being attached to said enclosure and extending freely downwardly and terminating in a free end,
said light source comprising an electrical lamp,
a lens for focusing light from said lamp onto said first end of said optical light,
said optical light having a second end,
said second end of said optical light being adapted to emit light from said lamp,
said yoke comprising a vertically extending portion adapted to be attached to a ceiling,
a generally horizontally extending portion attached to said vertically extending portion,
said reflector being fixed to said horizontally extending portion,
a handle on said horizontally extending portion,
said light source being attached to said yoke adjacent said vertically extending portion.

References Cited

UNITED STATES PATENTS

| | | | |
|---|---|---|---|
| 2,173,325 | 9/1939 | Alexander | 240—1.4 |
| 2,198,443 | 4/1940 | Paul et al. | 240—8.41 |
| 3,131,690 | 5/1964 | Innis et al. | 128—23 |

FOREIGN PATENTS 607,646   9/1948   Great Britain.

NORTON ANSHER, *Primary Examiner.*

J. F. PETERS, JR., *Assistant Examiner.*

U.S. Cl. X.R.

128—23; 240—1